Patented Nov. 21, 1933

1,936,010

UNITED STATES PATENT OFFICE 1,936,010

PROCESS OF MANUFACTURING SALINE COATINGS FOR THE ELECTRIC ARC WELDING OF ALUMINIUM-SILICON ALLOYS AND THE LIKE

Ferdinand de Pape, Brussels, Belgium, assignor to La Soudure Electrique Autogene, Ste. Ame, Brussels, Belgium No Drawing. Application October 30, 1931, Serial No. 572,235, and in France November 21, 1930

4 Claims. (Cl. 219—8)

The invention relates to a saline coating composition obtained by the process forming the subject matter of U. S. patent application No. 482,916 in the name of applicant, since matured into Patent No. 1,898,427, dated Feb. 21, 1933, but intended more particularly to constitute the flux coating for electrodes for welding with the electric arc, the metal core of which is composed of an aluminium-silicon alloy or an alloy of aluminium containing silicon.

In the manufacture of saline coating compositions or covering pastes for electrodes of aluminium or of aluminium alloys according to the prior patent referred to, there may be added in the decomposition phase or in the reaction phase and prior to the peptization operation, an alkaline sulphate or bi-sulphate or the like, intended to serve as a scouring agent, together with alkaline chlorides and fluosilicates constituting the principal mass of the coating material forming the flux.

It has however been found in practice that in electrodes of aluminium-silicon alloys or alloys of aluminium containing silicon, the addition of these scouring sulphates has the disadvantage of favouring the oxidation of the silicon during the process of fusion with the electric arc. This oxidation or combustion of the silicon has not only for its effect a substantial modification of the composition of the alloy but it also gives rise to blisters and/or to the inclusion of oxidation products which have an unfavorable influence upon the mechanical properties of the welding metal.

It has now been found that in the preparation of the saline coating composition in which a mixture of alkaline chlorides is decomposed with hydrofluosilicic acid or its equivalent, in order to form a gelatinous precipitate and the decomposition mixture or reaction mixture subsequently fixed by a peptization process, the use of certain sulphates of the metals of the cerium group prior to the addition of the peptization medium, gives rise to the formation of a chlorinated compound the presence of which in the coating composition avoids the disadvantages hereinbefore referred to. It is here a question of a new secondary reaction which is not produced with the so called stable sulphates disclosed in the above mentioned prior patent.

In the prior process referred to, the addition of the hydrofluosilicic acid to a mixture of alkaline chlorides displaces the chloride from the latter principally in the form of hydrochloric acid, whereas in the process according to the present invention the presence in the decomposition mixture, or the addition to the decomposition mixture of a cerium sulphate displaces the chlorine principally in elementary form and this chlorine is fixed with the other products of decomposition during the subsequent addition of the alkaline peptization medium.

The sulphate of the cerium group utilized is preferably cerium sulphate, $Ce(SO_4)_2$ or cerium bisulphate, but use can also be made with advantage of the mixture of raw sulphates of cerium earths (sulphate of cerium, of lanthanium and of didymium); originating for example from the treatment of monazite sands with a view to the extraction of the thorium.

The proportion of cerium sulphate added to the mixture of the alkaline chlorides and of hydrofluosilicic acid prior to the addition of the alkaline peptization medium (for example, potash lye), differs according to the aluminium-silicon alloys for which the flux-forming coating composition is destined. This proportion generally comprises between 1 and 10 per cent by weight of the peptized and dried coating composition.

The coatings of the electrodes of aluminium-silicon alloys or of aluminium alloys containing silicon obtained with the compositions prepared in accordance with the invention, are very active and give metallic deposits which are very pure and also homogeneous, without alteration of the composition of the metal used.

The advantageous effect resulting from the addition of a cerium sulphate, as described is not realized to the same extent when the cerium sulphate is added to the peptized coating composition.

What I claim is:

1. A process of manufacturing a saline coating containing halogen salts of the group of alkali metals and intended more especially to constitute the flux covering in electrodes of aluminium-silicon alloy or an alloy of aluminium containing silicon, comprising the steps of decomposing a mixture of alkaline chlorides with hydrofluosilicic acid or its equivalent, adding to the reaction mixture a sulphate of the cerium group and subsequently adding a basic peptizing agent to fix the reaction mixture in a peptization process.

2. A process of manufacturing a saline coating containing halogen salts of the group of alkali metals and intended more especially to constitute the flux covering in electrodes of aluminium-silicon alloy or an alloy of aluminium containing silicon, comprising the steps of decomposing a mixture of alkaline chlorides with hydrofluosilicic acid or its equivalent, adding to the reaction mixture cerium sulphate $Ce(SO_4)_2$, in the proportion of 1 to 10% by weight of the dried coating composition and subsequently adding a basic peptizing agent to fix the reaction mixture in a peptization process.

3. A method of preparing welding rod flux compositions comprising treating a saline mixture with an acid, adding a compound of a metal of the cerium group to the reaction mass, and peptizing the mass with a basic peptizing agent.

4. A method of preparing welding rod flux compositions, comprising treating a saline mixture with an acid, adding a quantity of a cerium compound ranging between 1 and 10% of the composition to the reaction mass, and peptizing the mass with a basic peptizing agent.

FERDINAND DE PAPE.